F. Stamm.
Mortising Machine.
Nº 21,783. Patented Oct. 12, 1858.
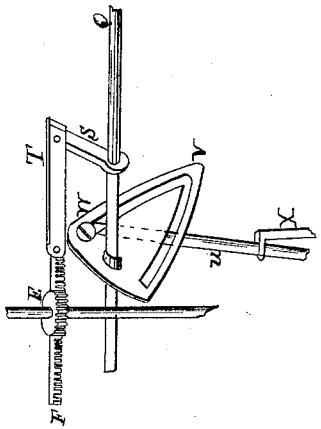
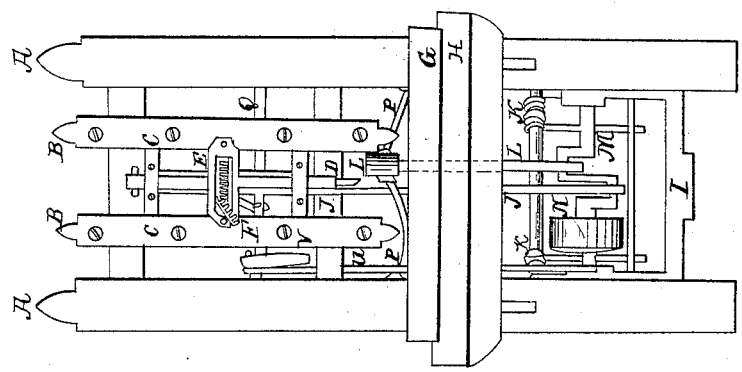
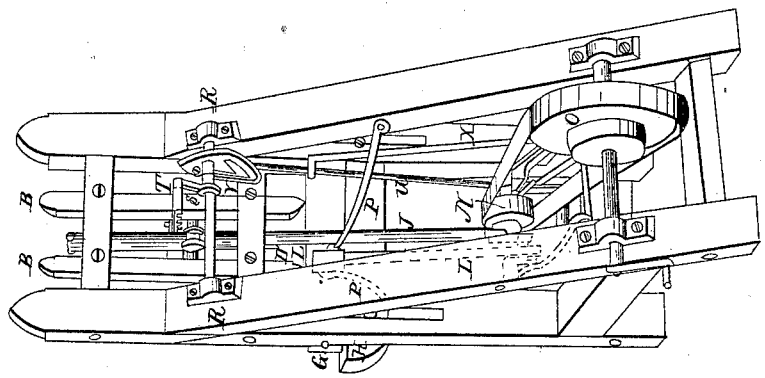

UNITED STATES PATENT OFFICE.

F. STAMM, OF LANCASTER, PENNSYLVANIA.

MODE OF REVERSING THE CHISEL IN MORTISING-MACHINES.

Specification of Letters Patent No. 21,783, dated October 12, 1858.

*To all whom it may concern:*

Be it known that I, FREDERICK STAMM, of Lancaster city, county of Lancaster, and State of Pennsylvania, have invented new and useful Improvements on Mortising-Machines; and I do hereby declare that the following is a full and exact description thereof, reference being had to the accompanying drawings, and to the letters of reference marked thereon, making a part of this specification.

The nature of my invention is a device attached to the machine for the purpose of reversing the chisel and expediting the mortising operation.

To enable others skilled in the art to make and use my invention I will proceed to describe its construction and operation.

A represents the upright frame; B the guides in which the crosshead C operates; D the chisel stock with the pinion E upon which the rack F operates; G the guard; H the bed upon which the piece of timber rests while being mortised.

I represents the ordinary treadle, for the purpose of drawing down the connecting rod J which is attached to the crosshead C for the purpose of bringing the chisel D down to its work.

K are springs that elevate the treadle I.

L is the balance rod with a weight on top to balance the crosshead C to take the jar off the treadle and cause the machine to run smoothly; M the crank shaft which is driven by the band pulley N driving the connecting rod J and balance rod L.

O is the main driving and band pulley.

P are two guide rods which are attached, one on each side, to the top of balance rod L, and on each side of frame A for the purpose of maintaining the vertical position of the balance rod L.

Q represents the rock shaft extending across the back part of machine with its ends operating in boxes R, R upon which shaft Q the devices for reversing the chisel D are operated; S the arm attached to shaft Q having a connecting rod T coupled to rack F, which rack F operates upon the pinion E for the purpose of reversing the chisel D. The advantage gained is that of reversing the chisel suddenly and smoothly, and avoiding any friction on the chisel excepting at the moment of its reversing.

U is a connecting rod attached to the side of treadle I which operates a V-shaped eccentric in its V-shaped slot, at the connecting bolt W which moves in the slot V up and down corresponding with the raising and lowering of the treadle I.

X is an upright spring extending from the lower part of frame A to near the upper end of rod U for the purpose of changing and reversing the rod U in the slot V from one side of the slot to the other.

I am aware of devices on mortising machines for reversing the chisel but these I do not claim.

What I claim as my invention and desire to secure by Letters Patent is—

The arrangement and combination of the devices E, F, Q, S, T, U, V, W and X substantially as described for the purpose of reversing the chisel while in operation.

F. STAMM.

Witnesses:
   JNO. FRANKLIN REIGART,
   M. CARPENTER.